(12) United States Patent
Collins

(10) Patent No.: US 9,945,971 B2
(45) Date of Patent: Apr. 17, 2018

(54) METHOD OF USING A PARABOLIC EQUATION MODEL FOR RANGE-DEPENDENT SEISMO-ACOUSTIC PROBLEMS

(71) Applicant: THE UNITED STATES OF AMERICA, AS REPRESENTED BY THE SECRETARY OF THE NAVY, Washington, DC (US)

(72) Inventor: Michael D. Collins, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 312 days.

(21) Appl. No.: 15/015,425

(22) Filed: Feb. 4, 2016

(65) Prior Publication Data
US 2017/0045634 A1 Feb. 16, 2017

Related U.S. Application Data

(60) Provisional application No. 62/114,113, filed on Feb. 10, 2015.

(51) Int. Cl.
G01V 1/38 (2006.01)
G01V 1/18 (2006.01)
G01S 5/18 (2006.01)

(52) U.S. Cl.
CPC .......... G01V 1/38 (2013.01); G01S 5/18 (2013.01); G01V 1/186 (2013.01); G01V 2210/123 (2013.01); G01V 2210/1232 (2013.01)

(58) Field of Classification Search
CPC . G01V 1/38; G01V 1/18; G01V 1/186; G01V 2210/1232; G01V 2210/123; G01S 5/18
See application file for complete search history.

(56) References Cited

U.S. PATENT DOCUMENTS

| 7,968,851 B2 * | 6/2011 | Rousso | G01T 1/161 |
| | | | 250/370.09 |
| 8,000,773 B2 * | 8/2011 | Rousso | A61B 5/415 |
| | | | 250/370.08 |

(Continued)

FOREIGN PATENT DOCUMENTS

WO WO-2005071442 A3 * 10/2005 ............... G01V 1/38

OTHER PUBLICATIONS

M. D. Collins, "Modeling Rayleigh and Stonely waves and other interface and boundary effects with the parabolic equation," J. Acoust. Soc. Am., Jun. 2005, vol. 117, pp. 3497-3503, Acoustical Society of America, College Park, MD, USA.

(Continued)

Primary Examiner — Isam A Alsomiri
Assistant Examiner — Amie M Ndure
(74) Attorney, Agent, or Firm — US Naval Research Laboratory; Suresh Koshy

(57) ABSTRACT

A method of modeling an aquatic environment or locating an acoustic source in the aquatic environment. A range-dependent medium is approximated in terms of a series of range-independent regions and obtaining single-scattering solutions across the vertical interfaces between regions. One or more acoustic waves are propagated from a known acoustic source through the range-dependent medium to one or more known seismoacoustic receivers to model iteratively the various solid and liquid layers of the range-dependent medium. Alternatively, one or more acoustic waves are reverse-propagated from one or more known seismoacoustic receivers through the range-dependent medium to determine whether an acoustic source is present within a user-defined range.

18 Claims, 9 Drawing Sheets

(56) References Cited

U.S. PATENT DOCUMENTS

| | | | | |
|---|---|---|---|---|
| 8,088,071 B2* | 1/2012 | Hwang | ............ | G01S 7/52079 600/437 |
| 8,506,491 B2* | 8/2013 | Wu | ............ | A61B 8/4427 327/145 |
| 8,571,881 B2* | 10/2013 | Rousso | ............ | A61B 5/417 600/431 |
| 8,606,349 B2* | 12/2013 | Rousso | ............ | A61B 5/418 424/9.1 |
| D699,359 S* | 2/2014 | Lindekugel | ............ | D24/186 |
| 8,644,910 B2* | 2/2014 | Rousso | ............ | A61B 5/02755 250/370.09 |
| 9,091,740 B2* | 7/2015 | Kwon | ............ | H04W 56/00 |
| 2003/0013966 A1* | 1/2003 | Barnes | ............ | A61B 5/0402 600/446 |
| 2006/0094960 A1* | 5/2006 | Phung | ............ | G01S 7/52017 600/437 |
| 2009/0018442 A1* | 1/2009 | Miller | ............ | G01S 7/52077 600/437 |
| 2009/0141587 A1* | 6/2009 | Welker | ............ | G01V 1/3817 367/16 |
| 2012/0065891 A1* | 3/2012 | Ikelle | ............ | G01V 1/28 702/17 |
| 2012/0163121 A1* | 6/2012 | Hardage | ............ | G01V 1/286 367/21 |
| 2012/0316785 A1* | 12/2012 | Liu | ............ | G01V 1/303 702/2 |
| 2015/0316669 A1* | 11/2015 | Probert | ............ | G01V 1/303 702/6 |
| 2015/0355373 A1* | 12/2015 | Zhuo | ............ | G06F 17/10 703/2 |

OTHER PUBLICATIONS

E. T. Küsel et al., "A single-scattering correction for large contrasts in elastic layers," J. Acoust. Soc. Am., Feb. 2007, vol. 121, pp. 808-813, Acoustical Society of America, College Park, MD, USA.

M. D. Collins, "A single-scattering correction for the seismoacoustic parabolic equation," J. Acoust. Soc. Am., Apr. 2012, vol. 131, pp. 2638-2642, Acoustical Society of America, College Park, MD, USA.

M, D. Collins, "The Stabilized Starter," J. Acoust. Soc. Am., Oct. 1999, vol. 106, pp. 1724-1726, .Acoustical Society of America, College Park, MD, USA.

F. A. Milinazzo et al., "Rational square-root approximations for parabolic equation algorithms," J. Acoust. Soc. Am., Feb. 1997, vol. 101, pp. 760-766, .Acoustical Society of America, College Park, MD, USA.

W. M. Sanders et al., "Nonuniform deptth grids in parabolic equation solutions," J. Acoust. Soc. Am., Apr. 2013, vol. 101, pp. 760-766, .Acoustical Society of America, College Park, MD, USA.

* cited by examiner

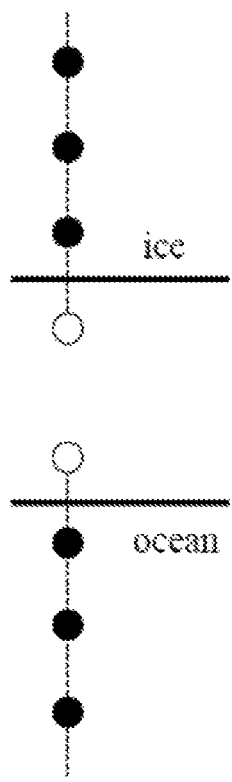
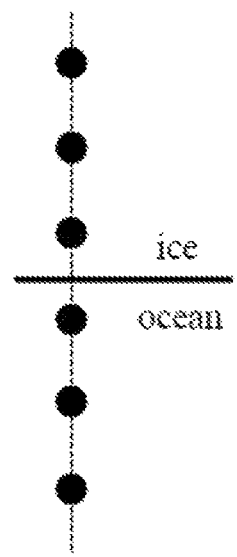
FIG. 7A
FIG. 7B

METHOD OF USING A PARABOLIC EQUATION MODEL FOR RANGE-DEPENDENT SEISMO-ACOUSTIC PROBLEMS

CROSS-REFERENCE TO RELATED APPLICATIONS

This application claims priority to U.S. Provisional Patent Application Ser. No. 61/114,113, entitled "PARABOLIC EQUATION MODEL FOR RANGE-DEPENDENT SEISMO-ACOUSTIC PROBLEMS," to Collins et al., which was filed on 10 Feb. 2015 and is incorporated herein by reference,

BACKGROUND OF THE INVENTION

Field of the Invention

This invention relates in general to method of using seismoacoustic sensing data, and in particular to method of using seismoacoustic sensing data to either locate an acoustic source or to determine the composition of an aquatic environment.

Description of the Related Art

Bodies of water, e.g., oceans, lakes, and rivers, include layers of fluids and solids. Examples of fluid layers include salt water, brackish water, and freshwater. Examples of solid (or elastic) layers include an ice layer on the surface of the body of water, a sandy or sedimentary layer at the bottom of the body of water, and a rock layer under the sandy or sedimentary layer. The layers often have sloping interfaces over a horizontal range. For acoustic waves traveling through such bodies of water, the fluid layers propagate compressional waves, and the solid layers propagate compressional waves and shear waves.

Because of their complex composition, such bodies of water do not behave like a range-independent acoustic waveguide with perfectly reflecting boundaries. Accordingly, solutions to seismoacoustic problems in bodies of water have herein lore been inaccurate or impossible.

BRIEF SUMMARY OF THE INVENTION

An embodiment of the instant invention addresses seismoacoustic problems involving such bodies of water. Such problems include localization of an acoustic source, based on a known body of water composition, and determination of a body of water composition, based on a known localization, of an acoustic source. Localization, of an acoustic source has, for example, maritime safety, security and stewardship applications. Determination of a body of water composition has, for example, oceanographic and maritime resource exploration applications. Such resources include, for example, minerals, natural gas, and oil.

An embodiment of the invention approximates a range-dependent medium in terms of a series of range-independent regions and obtaining single-scattering solutions across the vertical interfaces between regions. The embodiment further propagates one or more acoustic waves from a known acoustic source through the range-dependent, medium to one or more known seismoacoustic receivers to model iteratively the various solid and liquid layers of the range-dependent medium.

An embodiment of the invention approximates a range-dependent medium in terms of a series of range-independent regions and obtaining single-scattering solutions across the vertical interfaces between regions. The embodiment further reverse-propagates one or more acoustic waves from one or more known seismoacoustic receivers through the range-dependent medium to determine whether an acoustic source is present within a user-defined range.

BRIEF DESCRIPTION OF THE DRAWINGS

FIG. 7A is an illustrative interface between an ice layer and a water column, represented using artificial and real grid points, according to an embodiment of the invention.

FIG. 7B is an illustrative interface between an ice layer and a water column as in FIG. 7A with the artificial grid points eliminated, according to an embodiment of the invention.

DETAILED DESCRIPTION OF THE INVENTION

Figure 1:
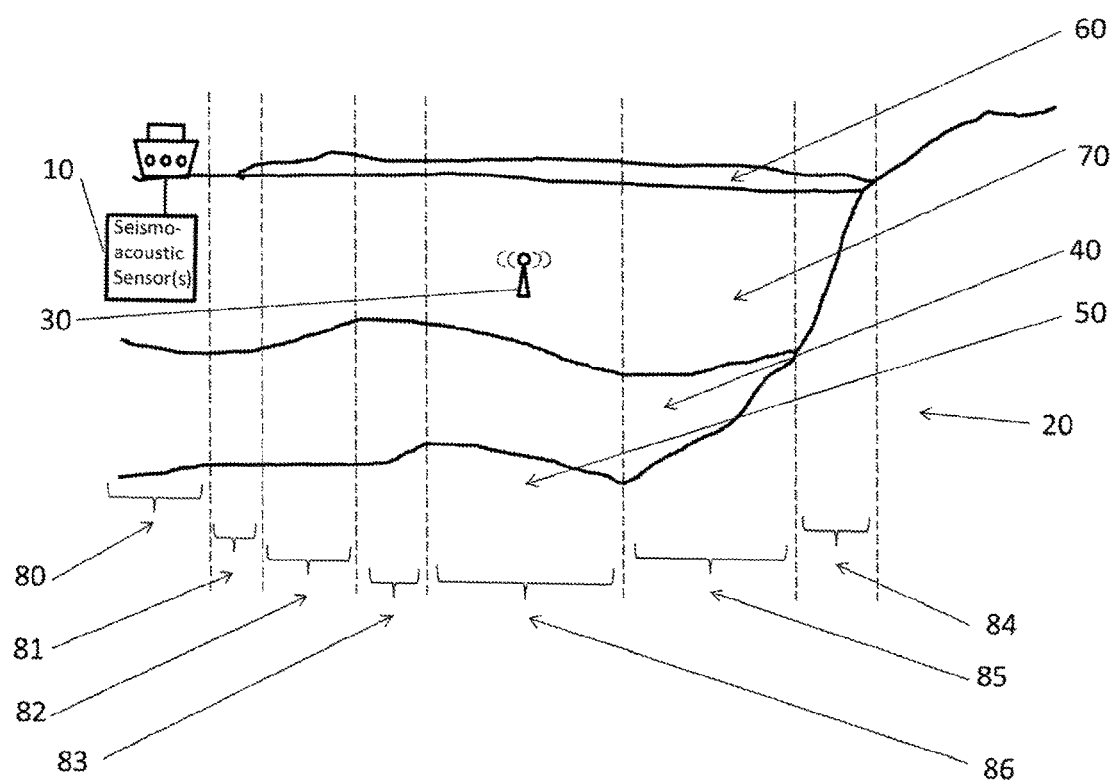
FIG. 1 is an illustrative cross-section of a body of water with one or more seismoacoustic sensors under the surface of the body of water and an acoustic source in the body of water, according to an embodiment of the invention.

An embodiment of the invention includes a method of locating a standard acoustic source within a user-defined maximum range, and described as follows with reference to FIGS. 1-4 and the flowchart shown by way of illustration in FIG. 5. Depending on a user's application, the user-defined maximum range is less than a mile, on the order of tens of miles, on the order of hundreds of miles, on the order of thousands of miles, or on the order often thousands of miles.

In Step S100, an acoustic signal is received from the acoustic source 10 through an aquatic environment 20 using at least one standard seismoacoustic sensor 30. The acoustic signal includes an acoustic pressure and an acoustic signal frequency. The acoustic signal includes compressional waves and shear waves. The environment includes a plurality of layers. The plurality of layers includes solid layers 40, 50, 60 and/or liquid layers 70. For example, the solid layers include an ice layer 60 floating on a liquid layer 70. The solid layers propagate the compressional waves and the shear waves; the liquid layers propagate the compressional waves. Also in Step S100, a plurality of initial conditions is determined from the received acoustic signal, the plurality of initial conditions being based on the acoustic pressure and the acoustic signal frequency. In Step S110, the aquatic environment 20 is digitized into a plurality of range-independent regions 80, 81, 82, 83, 84, 85, 86 and a plurality of vertical interfaces 90, 91, 92, 93, 94, 95, 96. Each vertical interlace of the plurality of vertical interfaces 90, 91, 92, 93, 94, 95, 96 is located between adjacent range-independent regions of the plurality of range-independent regions 80, 81, 82, 83,84, 85, 86. In Step S120, an initial transmitted field is determined for a range-independent region of the plurality of range-independent regions based, on the plurality of initial conditions and a subsequent incident field is determined, In Step S130, a subsequent transmitted Held is determined for an adjacent vertical interface of the plurality of vertical interfaces based on the subsequent incident field and determining a next incident field on an adjacent range-independent region of the plurality of range-independent regions. In Step S140, the subsequent transmitted field is determined for another range-independent region of the plurality of range-independent regions based on the next incident field and determining the subsequent incident field on another vertical interface of the at least one vertical interface. Step S150 includes a loop, depending on whether there are any more adjacent regions until a user-defined maximum range is reached. That is, Step 140 of determining the subsequent transmitted field for another range-independent region, of the plurality of range-independent regions based on the next incident field and determining the subsequent incident field on another vertical interface of the at least one vertical interface is repeated for the user-defined maximum range to approximate a propagation of the received acoustic signal propagating from the acoustic source via the environment to the at least one seismoacoustic sensor. In Step S160, an acoustic source location is determined based on the approximation. The acoustic source location is, for example, used to find a standard buried mine lying m a sediment layer in the aquatic environment. Alternatively, the acoustic source location is, for example, used to find an epicenter of an earthquake that may in a sediment, layer or lower solid layers in the aquatic environment. Alternatively, the acoustic source location is, for example, used to intercept the acoustic source, if it is hostile, as in the case of a standard foreign submarine in a fluid layer. Alternatively, the acoustic source location is, for example, used to monitor the acoustic source, if it is not hostile, as in the case of a standard marine creature, such as a whale.

Optionally, Step S140 of determining the subsequent transmitted field for an adjacent vertical interface of the plurality of vertical interfaces based on the subsequent incident field and determining a next incident field on an adjacent range-independent region of the plurality of range-independent regions includes using single scattering with a parabolic wave equation. Optionally, Step S140 of determining the subsequent transmitted field for an adjacent vertical interface of the plurality of vertical interfaces based on the subsequent incident field and determining-a next incident field on an adjacent range-independent region of the plurality of range-independent regions includes conserving horizontal displacement and tangential stress, and vertical displacement and normal stress. Optionally, the transmitted field includes an average of the conserved horizontal displacement and the tangential stress, and the conserved vertical displacement and the normal stress.

For the purpose of this patent application, the term "seismoacoustic sensor" includes standard seismic sensors (i.e., sensors with no acoustic sensing functionality), standard sensors, with both seismic sensing and acoustic sensing functionalities, or standard acoustic sensors (i.e., sensors with no seismic sensing functionality). Optionally, the at least one seismoacoustic sensor includes a standard one-dimensional vertical hydrophone array, a standard two-dimensional vertical hydrophone array, a standard three-dimensional vertical hydrophone array, a standard one-dimensional horizontal hydrophone array, a standard two-dimensional horizontal hydrophone array, a standard three-dimensional horizontal hydrophone array, a standard vertical water-body bottom-mounted hydrophone array, a standard horizontal water-body bottom-mounted hydrophone array, or a standard seismometer array.

Optionally, the acoustic signal further includes a solid layer motion, the plurality of initial conditions being further based on the solid layer motion.

Figure 2:
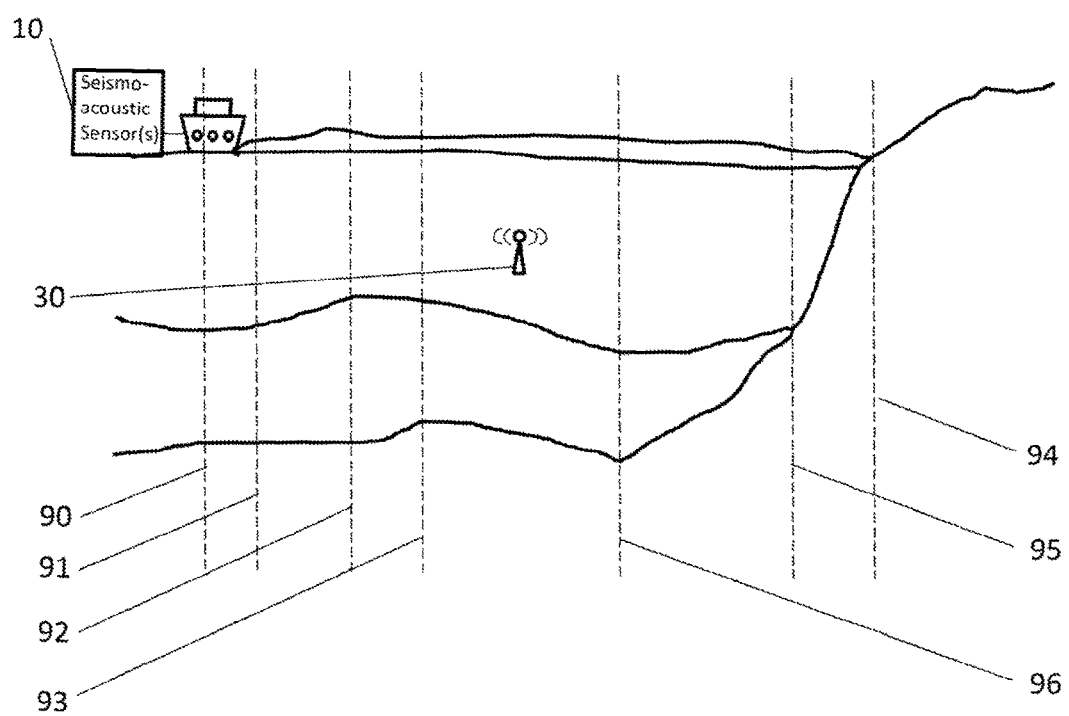
FIG. 2 is an illustrative cross-section of a body of water with one or more floating seismoacoustic sensors and an acoustic source in the body of water, according to an embodiment of the invention.
Figure 3:
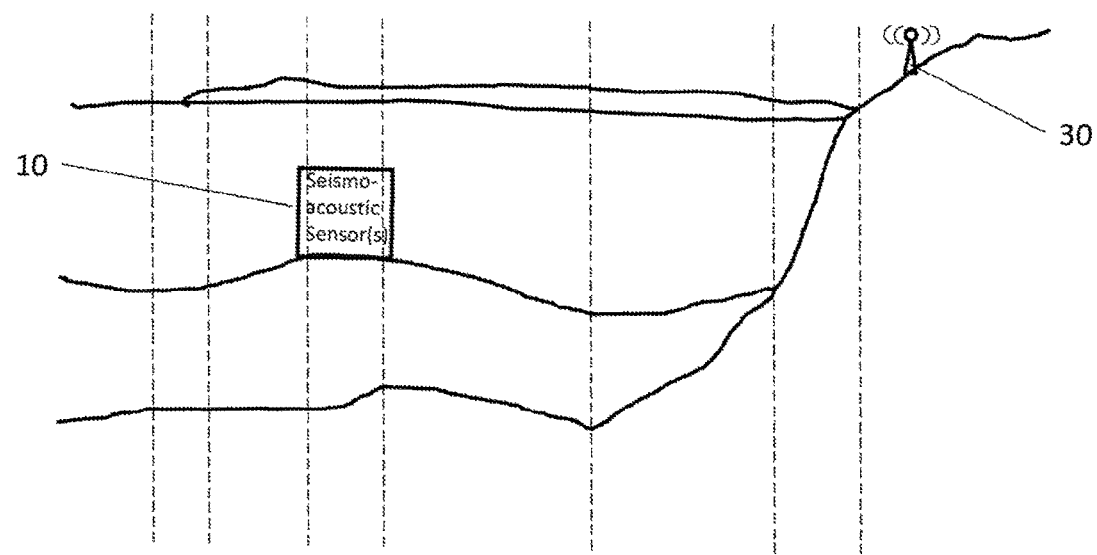
FIG. 3 is an illustrative cross-section of a body of water with one or more seismoacoustic sensors resting on the sandy or sedimentary bottom layer of the body of water and an acoustic source on land, according to an embodiment of the invention.
Figure 4:
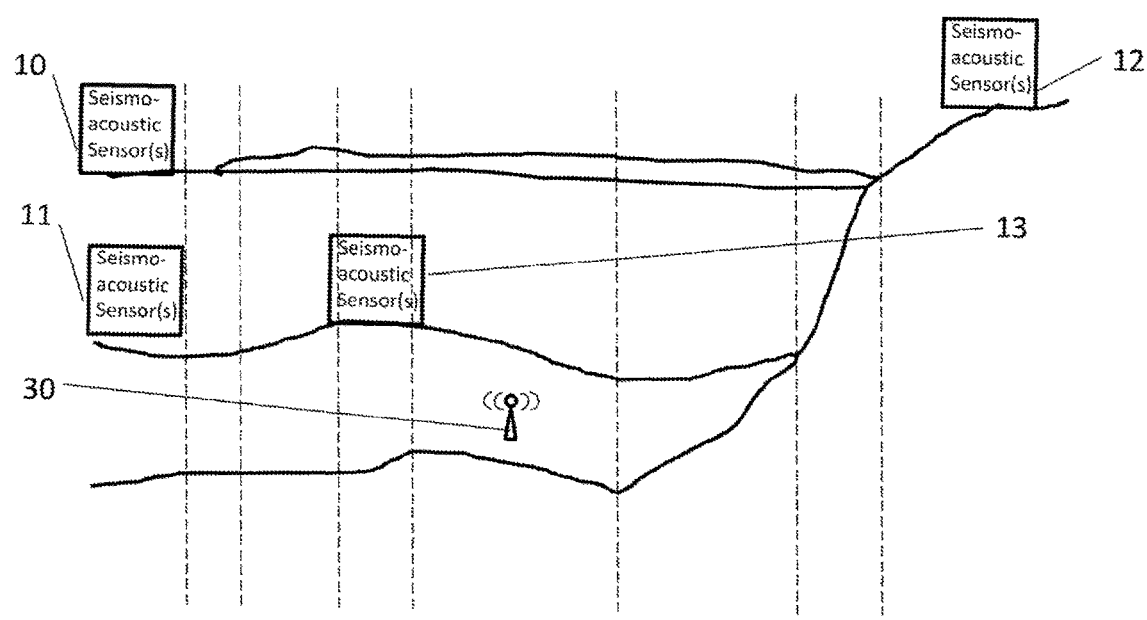
FIG. 4 is an illustrative cross-section of a body of water with one or more seismoacoustic sensors distributed in the body of water and an acoustic source, according to an embodiment of the invention.
Figure 5:
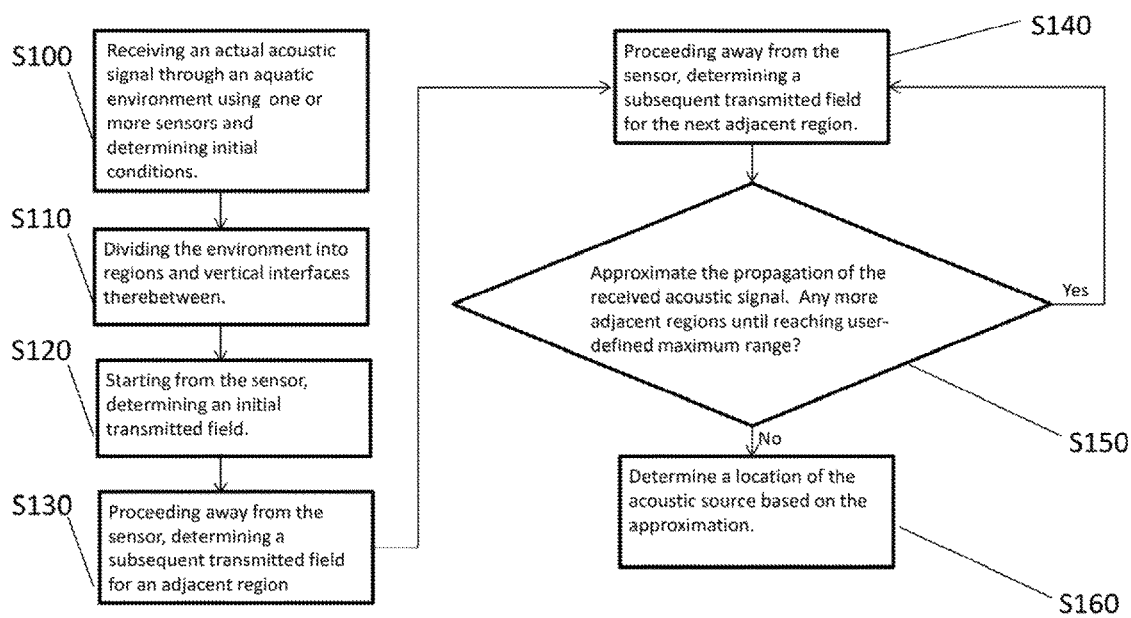
FIG. 5 is an illustrative flowchart of a method of locating an acoustic source, according to an embodiment of the invention.

Optionally, the at least one seismoacoustic sensor is located on land, for example, as in FIG. 4; floating on a body of water, for example, as in FIG. 2, in a body of water, for example, as in FIGS. 1 and 3, or under the body of water, for example, as in FIG. 4. The body of water is, for example, an ocean, a lake, or a river. For example, as shown by way of illustration in FIG. 4, the at least one seismoacoustic sensor includes an array of seismoacoustic sensors 10, 11, 12, 13 distributed through the aquatic environment and/or oft land.

Optionally, the acoustic source is located one of on land, for example, as in FIG. 3; in a body of water, for example, as in FIGS. 1 and 2; and under the body of water, for example, as in FIG. 4. For example, the acoustic source on land is a nuclear, or other, explosion. For example, the acoustic source in a body of water is a standard manned or unmanned maritime vehicle.

Figure 6:
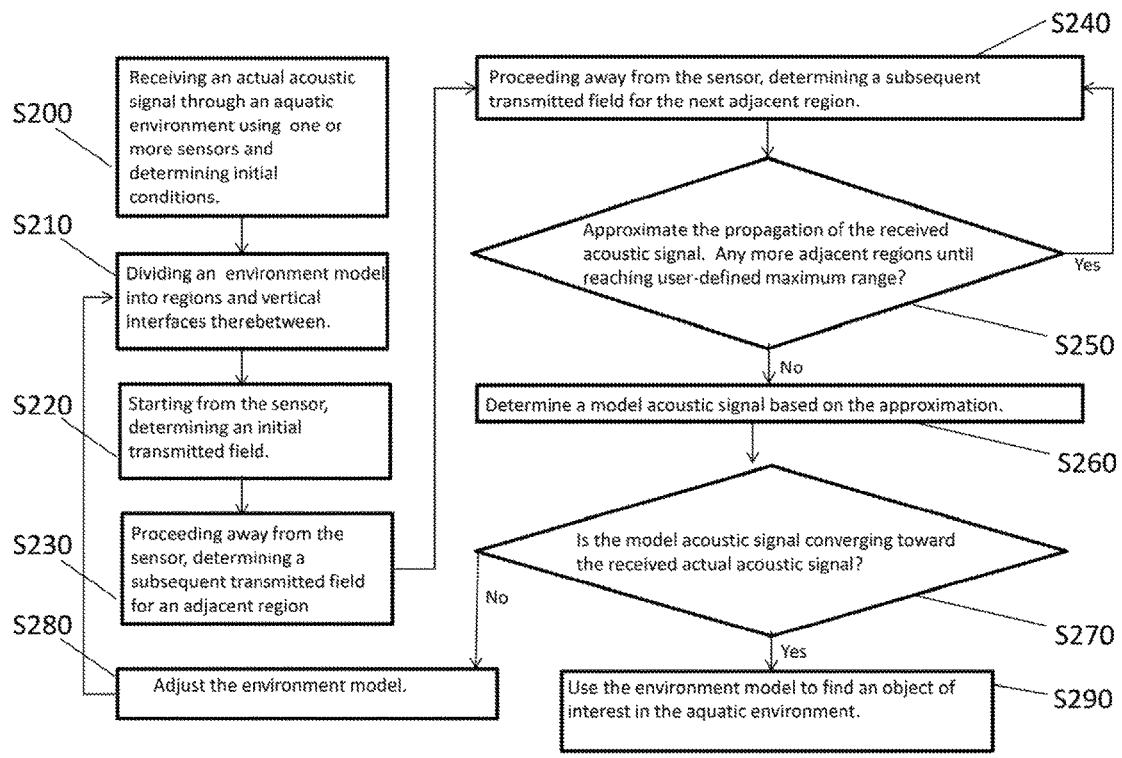
FIG. 6 is an illustrative flowchart of a method of determining a layer composition of a body of water, according to an embodiment of the invention.

Another embodiment of the invention includes a method of locating at least one object of interest in an aquatic environment within a user-defined maximum, range and is described as follows with reference to FIGS. 1-4 and the flow chart shown by way of illustration in FIG. 6. In Step S200, an actual acoustic signal is received from an acoustic source through the aquatic environment using at least one seismoacoustic sensor. The actual acoustic signal includes an acoustic pressure, an acoustic signal frequency, and an acoustic source location. The actual acoustic signal includes compressional waves and shear waves. The aquatic environment includes a plurality of actual layers. The plurality of actual layers includes solid actual layers and/or liquid actual layers. The solid actual layers propagate the compressional waves and the shear waves; the liquid actual layers propagate the compressional waves. Also in Step S200, a plurality of initial conditions is determined from the received actual acoustic signal The plurality of initial conditions is based on the acoustic pressure, the acoustic signal frequency, and the acoustic source location. In Step S210, an aquatic environment model is digitized into a plurality of range-independent regions and a plurality of vertical interfaces. Each vertical interface of the plurality of vertical interfaces is located between adjacent range-independent regions of the plurality of range-independent regions. The initial aquatic environment model includes a plurality of model layers. The plurality of model layers includes solid model layers and/or liquid model layers. The plurality of model layers includes a plurality of respective thickness geometries and a plurality of respective material densities. In Step S220, an initial transmitted field for a range-independent region of the plurality of range-independent regions is determined based on the plurality of initial conditions and determining a subsequent incident field. In Step S230, a subsequent transmitted field is determined for an adjacent vertical interlace of the plurality of vertical interfaces based on the subsequent incident field and determining a next incident field on an adjacent range-independent region of the plurality of range-independent regions. In Step S240, the subsequent transmitted field is determined for another range-independent region of the plurality of range-independent regions based on the next incident field and determining the subsequent incident field on another vertical interface of the at least one vertical interface. Step S250 includes a loop, depending on whether there are any more adjacent regions until the user-defined maximum range is reached. Step S240 of determining the subsequent transmitted field for another range-independent region of the plurality of range-independent regions based on the next incident field and determining the subsequent incident field on another vertical interface of the at least one vertical interlace is repeated for the user-defined maximum range to approximate a propagation of the-acoustic signal propagating from the acoustic source via the aquatic environment to the at least one seismoacoustic sensor. In Step S260, a model acoustic signal is determined based on the approximation. Step S270 include a loop depending on whether the model acoustic signal is converging toward the received actual acoustic signal. In Step S280, the aquatic environment, model is adjusted using standard methods, if the model acoustic signal is not converging toward the actual acoustic signal, and repeating Step S210 of digitizing the now adjusted environmental model. Step S220 of determining an initial transmitted field step. Step S230 of determining the subsequent transmitted field step for an adjacent vertical interface. Step S240 of determining the subsequent transmitted field for another range-independent region, Step S250 of looping until a user-defined maximum range is reached, and Step S260 of determining a model acoustic signal based on the approximation step, until the model acoustic signal converges toward the actual acoustic signal. In Step S290, the aquatic environment model is used to locate a least one object of interest in the aquatic environment, if the model acoustic signal is converging toward the actual acoustic signal.

Optionally, Step S230 of determining the subsequent transmitted field for an adjacent vertical interface of the plurality of vertical, interfaces based on the subsequent incident field and determining a next incident field on an adjacent range-independent region of the plurality of range-independent regions comprises using single scattering with a parabolic wave equation. Optionally, Step S230 of determining the subsequent transmitted field for an adjacent vertical interface of the plurality of vertical interfaces based on the subsequent incident field and determining a next incident field on an adjacent range-independent region of the plurality of range-independent regions comprises conserving horizontal displacement and tangential stress, and vertical displacement and normal stress. Optionally, the transmitted field includes an average of the conserved horizontal displacement and the tangential stress, and the conserved vertical displacement and the normal stress, Optionally, the at least one seismoacoustic sensor comprises a one-dimensional vertical hydrophone array, a two-dimensional vertical hydrophone array, a three-dimensional vertical hydrophone array, a one-dimensional horizontal hydrophone array, a two-dimensional horizontal hydrophone array, a three-dimensional horizontal hydrophone array, a vertical water-body bottom-mounted hydrophone array, a horizontal water-body bottom-mounted hydrophone array, and/or a seismometer array.

Optionally, the acoustic signal further includes a solid layer motion, the plurality of initial conditions being further based on the solid layer motion.

Optionally, the at least one seismoacoustic sensor is located one of on land, on a body of water, in a body of water, and under the body of water.

Optionally, the al least one object of interest includes at least one extractable resource. Optionally, the at least one extractable resource includes a mineral, natural gas, and/or oil Optionally, the at least one abject of interest includes an artifact, such as a sunken city, a plane wreckage, or a ship wreckage. One of ordinary skill in the art will readily appreciate that smaller objects of interest require use of higher acoustic source frequencies, and by extension shorter acoustic source wavelengths.

Optionally, the acoustic source is located on land, in a body of water, or under the body of water.

Yet another embodiment of the invention is described as follows. Inventor determined that the parabolic equation method provides an attractive combination of accuracy and efficiency for propagation problems in which the properties of the medium vary gradually in the horizontal directions. This approach is applicable to such range-dependent problems when outgoing energy dominates energy that is backscattered in the horizontal direction. The parabolic equation method has been extended to handle various effects that arise in problems that involve elastic layers, such as sloping interfaces, interface waves, and coupling to fluid layers. The elastic parabolic equation is extended to handle variable topography at the surface of a solid. This is an essential capability for seismic problems, but it is also useful for ocean acoustics problems involving ice cover with variable topography and propagation across the shoreline from ocean to land. The approach is based on approximating a range-dependent medium in terms of a series of range-independent regions and obtaining single-scattering solutions across the vertical interfaces between regions. Inventor has determined that handling the combination of a sloping fluid-solid interface and depth dependence in the solid involves use of a non-centered, four-point difference formula to approximate one of the interface conditions. Range dependence within the interior of the domain is handled using a single-scattering operator, such as discussed in E. T. Küsel, W. L., Siegmann, and M. D. Collins, "A single-scattering correction for large contrasts in elastic layers," J, Acoust. Soc. Am. 121, 808-813 (2007), incorporated herein by reference, and M. D. Collins, "A single-scattering correction for the seismoacoustic parabolic equation," 3, Acoust. Soc. Am. 131, 2638-2642 (2012), incorporated herein by reference. Range dependence at the boundary is handled using a single-scattering operator involving the normal stress and the normal derivative of the tangential stress.

Range-Independent Regions

The approach for a two-dimensional seismoacoustic problem in Cartesian coordinates is derived as follows, where the range x is the horizontal distance from a line source and z is the depth below a reference level, A range-dependent medium, such as an aquatic environment, is approximated in terms of a series of range-independent regions. With this approximation, a sloping interface or boundary becomes a series of stair steps. In each region, the elastic wave equation is in the form, $$\left( L \frac{\partial^2}{\partial x^2} + M \right) \begin{pmatrix} u_x \\ w \end{pmatrix} = 0, \tag{1}$$

where $u_x$ is the horizontal derivative of the horizontal displacement and w is the vertical displacement, in solid layers. The depth operators that appear in the 2×2 matrices L and M are defined by the equations, $$(\lambda+2\mu)\frac{\partial^2 u_x}{\partial x^2}+\frac{\partial}{\partial z}\left(\mu\frac{\partial u_x}{\partial z}\right)+\rho\omega^2 u_x+(\lambda+\mu)\frac{\partial^2 w}{\partial x^2 \partial z}+\frac{\partial\mu}{\partial z}\frac{\partial^2 w}{\partial x^2}=0, \quad (2)$$

$$\mu\frac{\partial^2 w}{\partial x^2}+\frac{\partial}{\partial z}\left((\lambda+2\mu)\frac{\partial w}{\partial z}\right)+\rho\omega^2 w+(\lambda+\mu)\frac{\partial u_2}{\partial z}+\frac{\partial\lambda}{\partial z}u_x=0, \quad (3)$$

where ω is the circular frequency, p is the density, the Lamé parameters λ and μ are defined by $\rho c_p^2=\lambda+2\mu$ and $\rho c_s^2=\mu$, and $c_p$ and $c_s$ are the compressional and shear wave speeds. The compressional and shear attenuations $\beta_p$ and $\beta_s$ (in decibels per wavelength) are taken into account by allowing the wave speeds to he complex. Factoring the operator in Eq. (1) and assuming that outgoing energy dominates energy that is backscattered in the horizontal, the following parabolic wave equation is obtained:

$$\frac{\partial}{\partial x}\binom{u_x}{w}=iT^{1/2}\binom{u_x}{w}, \quad (4)$$

where $T=L^{-1}M$. In order to solve Eq. (4), the operator square root is approximated using rational function. An initial condition is, for example, obtained using a standard self-starter (such as discussed in M. D. Collins, "The Stabilized Starter," J. Acoust. Soc. Am. 106. 1724-1726 (1999), incorporated herein by reference), and the approach only requires standard modifications for the more realistic ease of a point source in cylindrical geometry.

When implemented with finite-difference formulas obtained using Galerkin's method, the operators L and M account for continuous depth dependence within layers and interfaces between layers in the interior of the domain. (Galerkin's method is, for example, discussed in W. Jerzak, W. L. Siegmann, and M. D. Collins, "Modeling Rayleigh and Stonely waves and other interlace and boundary effects with the parabolic equation," J. Acoust. Soc. Am. 117, 3497-3503 (2005), incorporated herein by reference.) The tangential stress $\sigma_{xz}$ and normal stress $\sigma_{zz}$ are required to vanish at the top boundary. Since the boundary is horizontal in each range-independent region, the horizontal derivative of the tangential stress vanishes on the boundary, and the following boundary conditions are obtained, $$\sigma_{zz}=\lambda u_x+(\lambda+2\mu)\frac{\partial w}{\partial z}=0, \quad (5)$$

$$-\frac{\partial\sigma_{xz}}{\partial x}=\frac{\partial}{\partial z}(\lambda u_x)+\frac{\partial}{\partial z}\left((\lambda+2\mu)\frac{\partial w}{\partial z}\right)+\rho\omega^2 w=0. \quad (6)$$

Complications associated with the second derivative in Eq. (6) arise for problems involving sloping interfaces or boundaries. Solutions of Eq. (4) and other parabolic wave equations are obtained by approximating depth operators and interface and boundary conditions in terms of finite-difference formulas. Depending on the conditions and the choice of difference formulas, an interface or boundary may pass through a grid point or midway between two grid points. For the former case, problems arise at the vertical interfaces between regions. This issue can be avoided by using a set of dependent variables for which no second derivative term appears in the interlace and boundary conditions, but other issues arise in that formulation. An alternative approach involving the four-point difference formula is used as follows, $$\frac{\partial^2 w}{\partial z^2}\left(z-\frac{1}{2}h\right)=\frac{3w(z-h)-7w(z)+5w(z+h)-w(z+2h)}{2h^2}+O(h^2), \quad (7)$$

where h is the grid spacing. With this approach, an interface or boundary may be placed midway between two grid points. This formula was derived using Taylor expansions and the method of undetermined coefficients.

In the water column and in sediment layers in which shear waves may be neglected, the second row of Eq. (1) is empty and the first row corresponds to the acoustic wave equation, $$\frac{\partial^2 p}{\partial x^2}+\rho\frac{\partial}{\partial z}\left(\frac{1}{\rho}\frac{\partial p}{\partial z}\right)+k^2 p=0,$$

where p is the acoustic pressure and $k=\omega/c_p$ is the wave number. The operators L and M account for depth dependence within fluids and solids, but a horizontal fluid-solid interface must be handled explicitly with conditions for normal stress $\sigma_{zz}$, tangential stress $\sigma_{xz}$, and normal displacement, $$\sigma_{zz}=\lambda u_x+(\lambda+2\mu)\frac{\partial w}{\partial z}=-p,$$

$$-\frac{\partial\sigma_{xz}}{\partial x}=\frac{\partial}{\partial z}(\lambda u_x)+\frac{\partial}{\partial z}\left((\lambda+2\mu)\frac{\partial w}{\partial z}\right)+\rho\omega^2 w=0,$$

$$w=\frac{1}{\rho\omega^2}\frac{\partial p}{\partial z}.$$

The conditions, for vanishing stresses at the top boundary of the ice involve the operators in the above equations. Factoring the operator in Eq. (1) and assuming that energy that is backscattered in the horizontal is dominated by outgoing energy, the following parabolic wave equation is obtained, $$\frac{\partial u}{\partial x}=ik_0(1+X)^{1/2}u,$$

$$X=\frac{L^{-1}M-k_0^2}{k_0^2},$$

where is a reference wave number, and vector $u=(u_x, w)$.

Figure 8A:
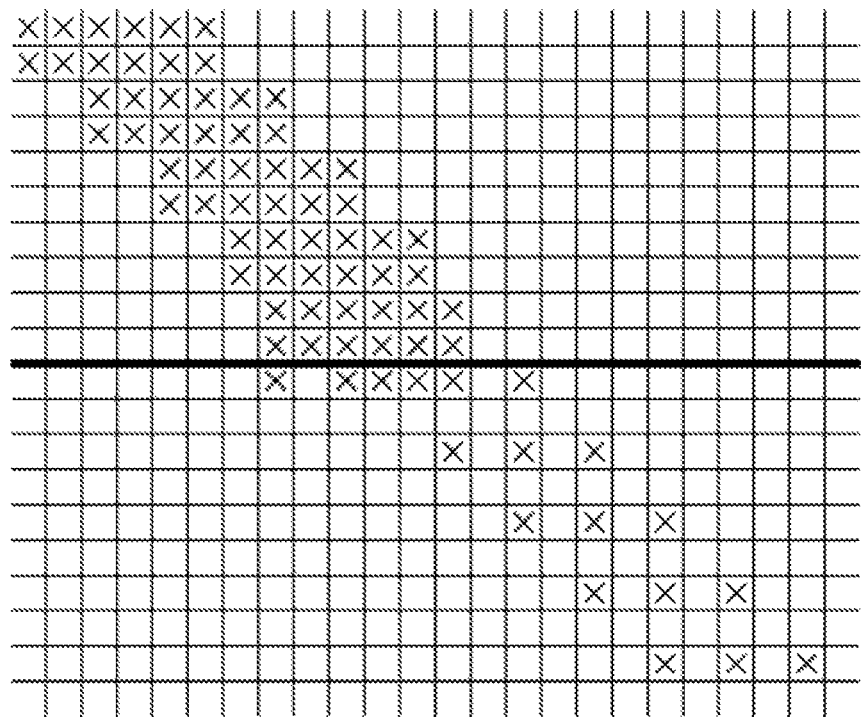
FIG. 8A is an illustrative matrix before Gaussian elimination, according to an embodiment of the invention.
Figure 8B:
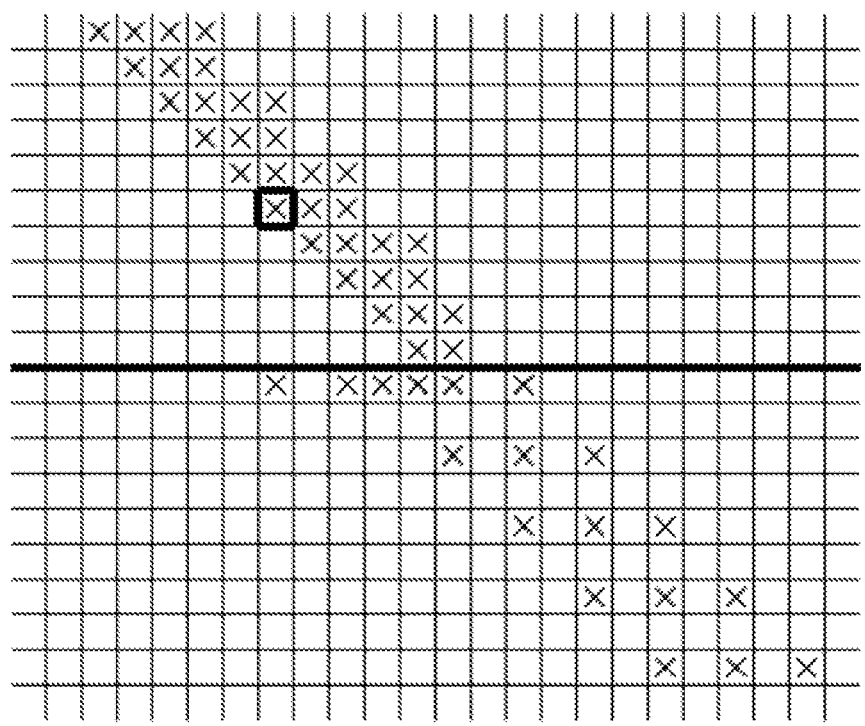
FIG. 8B is an illustrative matrix after Gaussian elimination, according to an embodiment of the invention.

In the numerical implementation of the depth operators, the conditions at the ice-ocean interface may be handled by introducing artificial grid points, such as shown by way of illustration in FIGS. 7A and 7B. The use of an artificial grid point is a standard mathematical approach for implementing boundary and interface conditions into partial differential equations. The actual values are not used. At each real and artificial grid point, the values of the acoustic pressure in the fluid and the displacements in the solid are functions. The problem is solved by determining the values of these functions, But, the values at the artificial grid points are eliminated by applying the expressions for the boundary and interface conditions. Because the elimination is done mathematically (or analytically), the specific values of the functions at the artificial grid points are not determined. FIGS. 7A and 7B show an implementation of conditions at the interface between an ice layer and a water column. Black dots represent real grid points within the ice and ocean. White dots represent artificial grid points that are introduced just outside those layers. The values of the dependent variables at the artificial grid points are eliminated using fume-difference formulas for the interface conditions. The interface passes halfway between the real and artificial grid points, as shown by way of illustration in FIG. 7A. After the artificial values are eliminated, the resulting grid has uniform spacing, as shown by way of illustration in FIG. 7B. In order to facilitate the treatment of range dependence, it is best to place the interface midway between real and artificial grid points in both layers. Such a grid can be implemented in the ($u_x$, w) formulation by using the four-point difference formula in Eq. (7), namely, $$\frac{\partial^2 w}{\partial z^2}\left(z + \frac{1}{2}h\right) = \frac{3w(z+h) - 7w(z) + 5w(z-h) - w(z-2h)}{2h^2} + O(h^2),$$

where h is the grid spacing. The interface conditions are used to obtain linear expressions for the values of the dependent variables at the artificial grid points in terms of the values of the dependent variables at the real grid, points. Away from the interface, the numerical implementation of the depth operators involves banded matrices, with six non-zero entries in each row of the ice layer and three non-zero entries in the odd rows of the water column. As shown by way of illustration in FIGS. 8A and 8B, no more than six entries come into play in any row during the elimination process. FIG. 8A shows, by way of illustration, part of a matrix before Gaussian elimination has proceeded to the bottom of an ice layer. After the entries below the main diagonal are eliminated throughout the ice layer, the first equation below the interface contains six entries. The first non-zero entry of that row can be eliminated without introducing a seventh non-zero entry by adding a linear combination of two of the rows above. FIG. 8B shows, by way of illustration, the same part of the matrix after Gaussian elimination has proceeded to the bottom of the ice layer. The bold horizontal line corresponds to the interface between the ice and the ocean. Away from the interface in the ice layer, there are six non-zero entries per row. Away from the interface in the water column, there are three non-zero entries in the odd rows, and the even rows are empty. The rows corresponding to the grid points adjacent to the interface contain additional non-zero entries below the main diagonal that correspond to the four-point difference formula. In the first row below the interface, the first entry is, for example, eliminated by adding a linear combination of the fifth row above (the highlighted entry lines up with the entry that is being eliminated) and the fourth row above, which is included to avoid introducing a non-zero value to the right of the entry that is being eliminated.

Vertical Interfaces Between Range-independent Regions

To separately account for different types of range dependence, advantage is taken of the fact that there is not a unique way to approximate a range-dependent medium in terms of a series of range-independent regions. Range dependence may consist of a combination of variable topography and variations within the interior of the domain, such as a sloping interface between layers. When both types of range dependence occur, the medium is further subdivided by splitting a vertical interface into two vertical interfaces that are separated by an arbitrarily thin intermediate region. The first interface accounts for changes in the interior. The second interface accounts for the change in the location of the top boundary. Variations within the interior of the domain may be handled with the single-scattering solution, $$\begin{pmatrix} u_x \\ w \end{pmatrix}_t = \frac{1}{2} T_B^{1/2} S_B^{-1} S_A T_A^{-1/2} \begin{pmatrix} u_x \\ w \end{pmatrix}_i + \frac{1}{2} R_B^{-1} R_A \begin{pmatrix} u_x \\ w \end{pmatrix}_t, \quad (8)$$

$$\begin{pmatrix} \sigma_{xx} \\ w \end{pmatrix} = R\begin{pmatrix} u_x \\ w \end{pmatrix}, \quad (9)$$

$$\begin{pmatrix} u \\ -\sigma_{xz} \end{pmatrix} = -iST^{-1/2}\begin{pmatrix} u_x \\ w \end{pmatrix}, \quad (10)$$

$$R = \begin{pmatrix} \lambda + 2\mu & \lambda \frac{\partial}{\partial z} \\ 0 & 1 \end{pmatrix}, \quad (11)$$

$$S = \begin{pmatrix} 1 & 0 \\ \lambda \frac{\partial}{\partial z} + \frac{\partial \lambda}{\partial z} & \frac{\partial}{\partial z}(\lambda + 2\mu)\frac{\partial}{\partial z} + \rho\omega^2 \end{pmatrix}, \quad (12)$$

where the subscripts i and t denote the incident and transmitted fields and the subscripts A and B denote the regions on the incident and transmitted sides of the vertical interface, and $r_{xx}$ and $r_{xz}$ are the normal and tangential stresses on the vertical interface. In fluid layers, the second rows of R and S are eliminated and the first rows are defined by $$\sigma_{xx} = -p,$$

$$u_x = \frac{1}{\rho\omega^2}\frac{\partial^2 p}{\partial x^2} = -\frac{k^2}{\rho\omega^2}p - \frac{1}{\omega^2}\frac{\partial}{\partial z}\left(\frac{1}{\rho}\frac{\partial p}{\partial z}\right).$$

When the medium is approximated in terms of a series of range-independent regions, the top boundary becomes a series of stair steps. To obtain a transmitted field across the vertical interface between two regions, two quantities are selected to be conserved across the vertical interface. For the up slope case, there is solid material on the transmitted side of the rise of the stair step, and the normal stress $\sigma_{xx}$ vanishes on this part of the vertical interface. Since the horizontal derivative of the tangential stress $\sigma_{xz}$ vanishes along the runs on both sides of the vertical interface, this quantity is small on the rise in the limit h→0. In the interior of the domain, the dependent variables and their derivatives are conserved across the vertical interlace, and the following condition is applied, $$\begin{pmatrix} u_x \\ w \end{pmatrix}_t = Q_B^{-1}\begin{pmatrix} \sigma_{xx} \\ -\frac{\partial \sigma_{xx}}{\partial x} \end{pmatrix}_t, \quad (13)$$

$$\begin{pmatrix} \sigma_{xx} \\ -\frac{\partial \sigma_{xz}}{\partial x} \end{pmatrix} = Q\begin{pmatrix} u_x \\ w \end{pmatrix}, \quad (14)$$

$$Q = \begin{pmatrix} \lambda + 2\mu & \lambda \frac{\partial}{\partial z} \\ \lambda \frac{\partial}{\partial z} + \frac{\partial \lambda}{\partial z} & \frac{\partial}{\partial z}(\lambda + 2\mu)\frac{\partial}{\partial z} + \rho\omega^2 \end{pmatrix}. \quad (15)$$

The transmitted field is obtained by selecting appropriate values for the incident quantities on the right side of Eq.

(13). When the boundary moves upward by one grid point, the incident quantities are set to zero at the new top grid point. which is located a half grid spacing below the boundary. If the dependent variables across the vertical interface had been, chosen to be matched, it would not be clear how to select values for those quantities at the new top grid point. When the boundary moves downward by one grid point, the incident values at the old top grid point are discarded, and a small amount of energy may be lost. The medium is approximated into a series of range-independent regions, and these regions may be subdivided by inserting intermediate regions. For the downslope ease, it is, for example, possible to improve accuracy by introducing an arbitrarily thin intermediate layer that has low wave speeds and density near the boundary and solving an additional single-scattering problem, A similar approach is, for example, used in the treatment of a sloping fluid-solid interlace.

Implementation of the Parabolic Equation Model

The parabolic equation method involves repeatedly solving systems of equations that must he updated when the medium varies with range. Gaussian elimination is not the most efficient approach for certain types of spatial dependence in the parameters of the medium. If there are two layers separated by a sloping interface and the parameters in each layer only depend on z, efficiency is, for example, optimized by using an elimination scheme that involves sweeping toward the interface from both directions. Matrices implementing the difference formula in Eq. (7) are, for example, created. Away from the interface in the water column, the odd rows contain three non-zero entries and the even rows correspond to the equations that have been eliminated. Away from the interface in the sediment, each row contains six non-zero entries. In the rows corresponding to the grid points that are adjacent to the inter-face, there are additional non-zero entries further from the main diagonal that correspond to the four-point difference formula. An approach for solving the system is described as follows. The first steps are elimination sweeps to the second grid point below the interface, first downward from the top of the grid and then upward from the bottom of the grid (necessarily in that, order). Entries below the main diagonal are eliminated in the downward sweep. Entries above the main diagonal are eliminated in the upward sweep. After these steps are completed, the matrices are stored in decomposed form in order to efficiently handle a series of range steps. The next step is to solve the 2×2 system that remains at the second grid point below the interface after the elimination steps; The final steps are back substitution sweeps from, the second grid point below the interface, first downward and then upward (necessarily in that order).

When the parameters in each layer only depend on z, variations in bathymetry have only a small effect on the efficiency of the solver. When the bathymetry varies, it is only necessary to update matrix entries and repeat the decomposition steps over a small number of rows. To efficiently handle a broader class of problems, the model requires the parameter profiles (which may be updated as the solution is marched in range) to be functions of z in the water column and deep within the sediment but allows a more general dependence (such as depth below the seafloor interface, a scenario that is often of interest in applications) in the upper sediment layers. If the total thickness of the upper sediment layers is small relative to the thickness of the entire computational grid, efficiency may be improved by using an elimination scheme that involves sweeping toward the sediment layers from both directions. With this approach, accounting for sloping interfaces only requires updating matrix entries and repeating the elimination steps within the upper sediment layers rather than throughout the entire sediment.

The parabolic equation solution is based on rational approximations of operators. It is often desirable to use several terms in the rational approximation that is used to advance the field through range-independent regions. Fewer terms may be sufficient in the rational approximation of the square root of die operator that arises in the single-scattering problem. Efficiency may be adversely affected if small grid spacings are used in layers with low shear speed. Since shear waves may often be neglected in such layers, the model offers the option to treat some of the tipper sediment layers as fluids. A combination of variable grid spacing and gradients in the attenuations may he used in the lower part of the computational grid in order to efficiently absorb energy and prevent non-physical reflections from the bottom boundary.

Another embodiment of the invention includes an extension of one or more of the embodiments described above. This embodiment handles thin elastic layers of an aquatic environment, for example, and is described as follows. Parabolic equation solutions are based on rational approximations that are designed using accuracy constraints to ensure that the propagating modes are handled properly and stability constrains to ensure that the non-propagating modes are annihilated. Inventor determined that the non-propagating modes are especially problematic for problems involving thin elastic layers. Stable results are obtained for such problems, for example, by using standard rotated rational approximations (such as discussed in F. A. Milinazzo, C. A. Zala, and G. H. Brooke, "Rational square-root approximations for parabolic equation algorithms," J. Acoust. Soc. Am. 101, 760-766 (1997), incorporated herein by reference) and generalizations of these approximations. This approach is applied to problems involving ice cover with variable thickness and sediment layers that taper to zero thickness.

Rational Approximations

In order to implement the parabolic equation, $$\frac{\partial u}{\partial x} = ik_0(1+X)^{1/2}u,$$

$$X = \frac{L^{-1}M - k_0^2}{k_0^2},$$

the operator square root is approximated in terms of a rational function of the form, $$(1+X)^{1/2} \cong 1 + \sum_{j=1}^{n} \frac{a_{j,n}X}{1+b_{j,n}X}. \tag{16}$$

There are various strategies for selecting the coefficients $a_{j,n}$ and $b_{j,n}$. For sufficiently large n, the propagating modes may be handled accurately using the coefficients, $$a_{j,n} = \frac{2}{2n+1}\sin^2\left(\frac{j\pi}{2n+1}\right),$$

$$b_{j,n} = \cos^2\left(\frac{j\pi}{2n+1}\right),$$

but stability issues associated with non-propagating modes may arise for problems involving elastic layers and sloping interfaces. To obtain stable solutions, Inventor determined that it is advantageous to design a rational approximation so that the region of the complex plane corresponding to non-propagating modes is mapped into the upper half of the complex plane. More specifically, Inventor determined that to obtain stable solutions, it is advantageous to use rotated rational approximations, which are equivalent to applying 2 n accuracy constraints at a point off the real axis. If this point is not far from X=0, stability may be improved by trading off a minimal amount of accuracy. When the accuracy constraints are applied at X=0, the upper and lower half planes are mapped onto themselves and the branch cut of the square root function is on the negative real axis. Rotated rational approximations are based on a change of-variables corresponding to the following equation:

$$(1+X) = e^{j\theta}(1+\tilde{X}), \tag{17}$$

where $\theta$ is the rotation angle of the branch cut. Substituting into the square root function and applying the general rational approximation equation, Eq. (17), in terms of $\tilde{X}$, the rotated rational approximation equation is:

$$(1+X)^{1/2} = e^{j\theta/2}(1+\tilde{X})^{1/2} \cong e^{j\theta/2} + e^{j\theta/2} \sum_{j=1}^{n} \frac{a_{j,n}\tilde{X}}{1+b_{j,n}\tilde{X}}. \tag{18}$$

This rotated rational approximation corresponds to matching 2 n derivatives at $\tilde{X}=0$, which corresponds to $X=e^{j\theta}-1$. Using the general, rational, approximation equation, Eq. (17), to eliminate $\tilde{X}$ from the right side of the particular rational approximation equation, Eq. (18), and performing algebraic manipulations, the rotated rational approximation is:

$$(1+X)^{1/2} \cong e^{j\theta/2}\left[1 + \sum_{j=1}^{n} \frac{a_{j,n}(e^{-i\theta}-1)}{1+b_{j,n}(e^{-i\theta}-1)}\right] + \sum_{j=1}^{n} \frac{\tilde{a}_{j,n}X}{1+\tilde{b}_{j,n}X}, \tag{19}$$

$$\tilde{a}_{j,n} = \frac{e^{-i\theta/2}a_{j,n}}{[1+b_{j,n}(e^{-i\theta}-1)]^2},$$

$$\tilde{b}_{j,n} = \frac{e^{-i\theta}b_{j,n}}{1+b_{j,n}(e^{-i\theta}-1)}.$$

When an appropriate value is chosen for $k_0$, the propagating modes correspond to a neighborhood of X=0, and the values of n and $\theta$ should be chosen so that the particular rational approximation equation is accurate near X=0, which corresponds to $\tilde{X}=e^{j\theta}-1$. Because the bracketed, term in the rotated rational approximation corresponds to the right side of the particular rational approximation equation evaluated at $\tilde{X}=e^{j\theta}-1$, the following equation is obtained:

$$(1+X)^{1/2} \cong 1 + \sum_{j=1}^{n} \frac{\tilde{a}_{j,n}X}{1+\tilde{b}_{j,n}X}. \tag{20}$$

To obtain stable solutions, it is necessary to map part of the third quadrant of the complex plane into the upper half plane, The amount of the third quadrant that must be mapped into the upper half plane depends on the locations of the eigenvalues that correspond to the non-propagating modes. This information is not available in general, but it is known that rays corresponding to larger values of $\alpha$ must be mapped into the upper half plane for problems involving thin layers.

In order for the parabolic equation method to accurately handle the propagating modes out to long ranges, the rational approximation must be very accurate near X=0. It is necessary to ensure that the non-propagating modes do not cause stability problems, but it is not necessary to handle them accurately. It is, for example, possible to improve the tradeoff between accuracy and stability by applying the rotation approach to a set of coefficients that have been preconditioned by using one or more stability constraints to force part of the third quadrant into the upper half plane. The preconditioned approximation maps more of the third quadrant into the upper half plane. With this approach, it may be possible to use a smaller rotation angle and thus keep the accuracy constraints closer to X=0.

The rotation approach has been generalized to rational approximations of the exponential function, $$\exp[ik_0\Delta r(1+X)^{1/2}] \cong \exp(ik_0\Delta r)\prod_{j=1}^{n} \frac{1+a_{j,n}X}{1+b_{j,n}X}, \tag{21}$$

where $\Delta r$ is the range step in the parabolic equation solution. Substituting the general rational approximation equation, Eq. (17), into Eq. (21) above and applying a similar derivation, the following equation is obtained:

$$\exp[ik_0\Delta r(1+X)^{1/2}] \cong \exp(ik_0\Delta r)\prod_{j=1}^{n} \frac{1+\tilde{a}_{j,n}X}{1+\tilde{b}_{j,n}X}, \tag{22}$$

$$\tilde{a}_{j,n} = \frac{a_{j,n}e^{-i\theta}}{1+a_{j,n}(e^{-i\theta}-1)},$$

$$\tilde{b}_{j,n} = \frac{b_{j,n}e^{-i\theta}}{1+b_{j,n}(e^{-i\theta}-1)}.$$

When combined with standard numerical techniques (the splitting method and Crank-Nicolson integration), parabolic equation solutions that are based on Eq. (20) are, for example, viewed as rational approximations of the exponential function, but such approximations are accurate to a lower order in $k_0\Delta r$. The key to stability is for the rays to be mapped within the unit circle. The key to accuracy is for an interval about X=0 along the first ray to be mapped onto the unit circle. The rational approximation based on Eq. (22) is accurate over a wider interval than the rational approximation based on Eq. (20).

Rotated rational approximations according to this embodiment of the invention provide stable parabolic equation solutions for problems involving ice cover and other thin elastic layers, even when layer thickness tapers to zero. For some cases, it is necessary to use a rotation angle greater than 90°. The rotated rational approximations achieve stability at the cost of moving all of the accuracy constraints far from the eigenvalues that are associated with the propagating modes. An advantage of the rotated rational approximations is that analytic expressions exist for the coefficients, but this embodiment of the invention is believed to be an effective numerical approach has been developed for determining the coefficients corresponding to various types of constraints.

Portions of the invention operate in a standard computing operating environment, for example, a desktop computer, a laptop computer, a mobile computer, a server computer, and the like, in which embodiments of the invention may be practiced. While the invention is described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention, may be practiced with other computer system configurations, including hand-held devices, multiprocessor systems, microprocessor-based, or programmable consumer electronics, minicomputers, mainframe computers, autonomous embedded computers, and the like. The invention may also be practiced in distributed computing environments where tasks are performed, by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller (not shown) connected to the bus. The mass storage device and its associated computer-readable media provide non-volatile storage for the computer. Although the description of computer-readable media contained herein refers to a mass storage device, such as a hard disk or CD-ROM drive. It should be appreciated by those skilled in the art that computer-readable media can be any available media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired, information and which can be accessed by the computer.

According to various embodiments of the invention, the computer may operate in a networked environment using logical connections to remote computers through a network, such as a local network, the Internet, etc. for example. The computer may connect to the network through a network interlace unit connected to the bus. It should be appreciated that the network interface unit may also he utilized to connect to other types of networks and remote computing systems.

The computer may also include an input/output controller for receiving and processing input from a number of other devices, including a keyboard, mouse, etc.. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer-implemented acts or program modules running on a computing system and/or as interconnected machine logic circuits or circuit modules within the computing system. The implementation is a matter of choice dependent on the performance requirements of tire computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing front the scope of the invention.

These and other implementations are within the scope of the following claims.

What is claimed as new and desired to be protected by letters Patent of the United States is:

1. A method of locating an acoustic source within a user-defined maximum range, the method comprising:
   receiving an acoustic signal from the acoustic source through an aquatic environment using at least one seismoacoustic sensor, the acoustic signal comprising an acoustic pressure and an acoustic signal frequency, the acoustic signal comprising compressional waves and shear waves, the environment comprising a plurality of layers, the plurality of layers comprising at least one of solid layers and liquid layers, the solid layers propagating the compressional waves and the shear waves, the liquid layers propagating the compressional waves;

determining from the received acoustic signal a plurality of initial conditions, the plurality of initial conditions being based on the acoustic pressure and the acoustic signal frequency;

digitizing the aquatic environment into a plurality of range-independent regions and a plurality of vertical interfaces, each vertical interface of the plurality of vertical interfaces being located between adjacent range-independent regions of the plurality of range-independent regions;

determining an initial transmitted field for a range-independent region of the plurality of range-independent regions based on the plurality of initial conditions and determining a subsequent incident field;

determining a subsequent transmitted field for an adjacent vertical interlace of the plurality of vertical interfaces based on the subsequent incident field and determining a next incident field on an adjacent range-independent region of the plurality of range-independent regions;

determining the subsequent transmitted field for another range-independent region of the plurality of range-independent regions based on the next incident field and determining the subsequent incident field on another vertical interface of the at least one vertical interface;

repeating for the user-defined maximum range determining the subsequent transmitted field for another range-independent region of the plurality of range-independent regions based on the next incident field and determining the subsequent incident field on another vertical interface of the at least one vertical interface, thereby approximating a propagation of the received acoustic signal propagating from the acoustic source via the environment to the at least one seismoacoustic sensor;

determining an acoustic source location based on the approximation.

2. The method according to claim 1, wherein said determining the subsequent transmitted field for an adjacent vertical interface of the plurality of vertical interfaces based on the subsequent incident field and determining a next incident field on an adjacent range-independent region of the plurality of range-independent regions comprises using single scattering with a parabolic wave equation.

3. The method according to claim 2, wherein said determining the subsequent transmitted field for an adjacent vertical interlace of the plurality of vertical interfaces based on the subsequent incident field and determining a next incident field on an adjacent range-independent region of the plurality of range-independent regions comprises conserving horizontal displacement and tangential stress, and vertical displacement and normal stress.

4. The method according to claim 3, wherein said transmitted field comprises an average of the conserved horizontal displacement and the tangential stress, and the conserved vertical displacement and the normal stress.

5. The method according to claim 1, wherein the at least one seismoacoustic sensor comprises at least one of a one-dimensional vertical hydrophone array, a two-dimensional vertical hydrophone array, a three-dimensional vertical hydrophone array, a one-dimensional horizontal hydrophone array, a two-dimensional horizontal hydrophone array, a three-dimensional horizontal hydrophone array, a vertical water-body bottom-mounted hydrophone array, a horizontal water-body bottom-mounted hydrophone array, and a seismometer array.

6. The method according to claim 1, wherein the acoustic signal further comprises a solid layer motion, the plurality of initial conditions being further based on the solid layer motion.

7. The method according to claim 1, wherein the at least one seismoacoustic sensor is located one of on land, on a body of water, in the body of water, and under the body of water.

8. The method according to claim 1, wherein the acoustic source is located one of on land, in a body of water, and under the body of water.

9. A method of locating at least one object of interest in an aquatic environment within a user-defined maximum range, the method comprising:

receiving an actual acoustic signal from an acoustic source through the aquatic embroilment using at least one seismoacoustic sensor, the actual acoustic signal comprising an acoustic pressure, an acoustic signal frequency, and an acoustic source location, the actual acoustic signal comprising compressional waves and shear waves, the aquatic environment comprising a plurality of actual layers, the plurality of actual layers comprising at least one of solid actual layers and liquid actual layers, the solid actual layers propagating the compressional waves and the shear waves, the liquid actual layers propagating the compressional waves;

determining from the received actual acoustic signal a plurality of initial conditions, the plurality of initial conditions being based on the acoustic pressure, the acoustic signal frequency, and the acoustic source location;

digitizing an aquatic environment, model into a plurality of range-independent regions and a plurality of vertical interfaces, each vertical interface of the plurality of vertical interfaces being located between adjacent range-independent regions of the plurality of range-independent regions, the initial aquatic environment model comprising a plurality of model layers, the plurality of model layers comprising at least one of solid model layers and liquid, model layers, the plurality of model layers comprising a plurality of respective thickness geometries and a plurality of respective material densities;

determining an initial transmitted field for a range-independent region of the plurality of range-independent regions based on the plurality of initial conditions and determining a subsequent incident field;

determining a subsequent transmitted field for an adjacent vertical interface of the plurality of vertical interlaces based on the subsequent incident field and determining a next incident field on an adjacent range-independent region of the plurality of range-independent regions;

determining the subsequent transmitted field for another range-independent region of the plurality of range-independent regions based on the next incident field and determining the subsequent incident field on another vertical interface of the at least one vertical interface;

repeating for the user-defined maximum range determining the subsequent transmitted field for another range-independent region of the plurality of range-independent regions based on the next incident field and determining the subsequent incident field on another vertical interface of the at least one vertical interface, thereby approximating a propagation of the acoustic signal propagating from the acoustic source via the aquatic environment to the at least one seismoacoustic sensor;

determining a model acoustic signal based on the approximation;

determining whether the model acoustic signal is converging toward the received actual acoustic signal;

adjusting the aquatic environment model, if the model acoustic signal is not converging toward the actual acoustic signal, and repeating said determining an initial transmitted field step, said determining the subsequent transmitted field step for an adjacent vertical interlace, said determining the subsequent transmitted field for another range-independent region, said repeating step, said determining a model acoustic signal based on the approximation step, until the model acoustic signal converges toward the actual acoustic signal; and using the aquatic environment model to locate at least one object of interest in the aquatic environment.

10. The method according to claim 9, wherein said determining the subsequent transmitted field for an adjacent vertical interface of the plurality of vertical interfaces based on the subsequent incident field and determining a next incident field on an adjacent range-independent region of the plurality of range-independent regions comprises using single scattering with a parabolic wave equation.

11. The method according to claim 10, wherein said determining the subsequent transmitted field for an adjacent vertical interface of the plurality of vertical interfaces based on the subsequent incident field and determining a next incident field on an adjacent range-independent region of the plurality of range-independent regions comprises conserving horizontal displacement and tangential stress, and vertical displacement and normal stress.

12. The method according to claim 11, wherein said transmitted field comprises an average of the conserved horizontal displacement and the tangential stress, and the conserved vertical displacement and the normal stress.

13. The method according to claim 9, wherein the at least one seismoacoustic sensor comprises at least one of a one-dimensional vertical hydrophone array, a two-dimensional vertical hydrophone array, a three-dimensional vertical hydrophone array, a one-dimensional horizontal hydrophone array, a two-dimensional horizontal hydrophone array, a three-dimensional horizontal hydrophone array, a vertical water-body bottom-mounted hydrophone array, a horizontal water-body bottom-mounted hydrophone array, and a seismometer array.

14. The method according to claim 9, wherein the acoustic signal further comprises a solid layer motion, the plurality of initial conditions being further based on the solid layer motion.

15. The method according to claim 9, wherein the at least one seismoacoustic sensor is located one of on land, in a body of water, and under the body of water.

16. The method according to claim 9, wherein the at least one object of interest comprises at least one extractable resource.

17. The method according to claim 16, wherein the at least one extractable resource comprises at least one of a mineral, natural gas, and oil.

18. The method according to claim 9, wherein the acoustic source is located one of on land, in a body of water, and under the body of water.

* * * * *